United States Patent [19]

Amemiya

[11] 3,930,256

[45] Dec. 30, 1975

[54] DEVICE FOR STANDARDIZING A MAXIMUM VALUE OF AN OUT-PUT SIGNAL CORRESPONDING TO AN INPUT ANALOG SIGNAL

[75] Inventor: Hiroshi Amemiya, Fujisawa, Japan

[73] Assignee: Tokyo Shibaura Electric Co., Ltd., Kawasaki, Japan

[22] Filed: Apr. 8, 1974

[21] Appl. No.: 459,042

[30] Foreign Application Priority Data

Apr. 14, 1973 Japan .............................. 48-42335

[52] U.S. Cl. ............. 340/347 R; 340/172; 307/264; 328/168

[51] Int. Cl.$^2$ ........................................ H03K 13/00

[58] Field of Search... 340/347 AD, 347 CC, 347 R; 324/103 R, 103 P; 328/168–173, 174; 307/264

[56] References Cited

UNITED STATES PATENTS

| | | | |
|---|---|---|---|
| 3,221,253 | 11/1965 | Keyes | 324/103 P |
| 3,412,330 | 11/1968 | Klaver | 324/103 R |
| 3,573,804 | 4/1971 | Picou | 340/347 AD |

*Primary Examiner*—Charles D. Miller
*Attorney, Agent, or Firm*—Oblon, Fisher, Spivak, McClelland & Maier

[57] ABSTRACT

A device for standardizing the maximum value of an output signal corresponding to an input analog signal comprises an A-D converter for converting an input analog signal into digital signals in a manner to correspond to a standard reference voltage or to a compensated reference voltage; a means for storing during an initiating period the maximum value of the output signals from the A-D converter which correspond to the standard reference voltage; a means for obtaining a compensation voltage from an analog signal corresponding to the complementary signal of the maximum value; and a means for operating the A-D converter, after lapse of the initiating period, in response to a compensated reference voltage obtained through subtraction of the compensation voltage from the standard reference voltage, to obtain from the A-D converter an output signal having a predetermined maximum value.

4 Claims, 2 Drawing Figures

DEVICE FOR STANDARDIZING A MAXIMUM VALUE OF AN OUT-PUT SIGNAL CORRESPONDING TO AN INPUT ANALOG SIGNAL

This invention relates to a device for standardizing to a predetermined value the maximum value of an output signal corresponding to an input analog signal.

It is desirable to standardize to a predetermined value the maximum value of an analog signal, for example, a train of electro-cardiac waveform and plot an electrocardiogram having a predetermined maximum amplitude on recording paper of predetermined size. Likewise, it is necessary to provide a numerical representation of an electrocardiogram using a digital signal having a predetermined maximum value. The requiste that no complicated operation is to be required in providing such waveform representation or numerical representation is a matter of very importance.

As a means for maintaining the level of an analog signal constant, an automatic gain control circuit or A.G.C circuit is publicly known. The A.G.C. circuit is adapted to maintain the level of an information signal constant by feeding back to the input of a variable-gain amplifier of the A.G.C circuit an information signal derived from a carrier wave which is modulated by a certain information signal (analog signal). However, since an information signal is reproduced from a modulated wave using an envelope rectifying circuit and a time constant circuit, the distortion of an output signal information can not be removed if the information signal is of a low frequency or DC current. Furthermore, the abovementioned method requires a complicated circuit and it will be apparent that it is not suitable, for example, for the amplitude standardization of an electro-cardiac waveform.

It is accordingly the object of this invention to provide a device for standardizing the maximum value of an output signal to a predetermined level for the device, which is free from any drawbacks as encountered in the prior art device and is capable of converting an input analog signal, irrespective of its frequency, into a digital signal, or an analog signal, having the predetermined level.

A device according to this invention comprises an A-D converter for converting an input analog signal into digital signals in a manner to correspond to a standard reference voltage or to a compensated reference voltage; an output register for storing the output digital signal of the A-D converter for each predetermined period corresponding to a sampling period of the A-D converter and permitting the stored signal to be read out therefrom; a means for storing through the output register a maximum-valued one of the digital signals from the A-D converter which correspond to the standard reference voltage, and producing a complementary signal of the maximum-valued digital signal; a means for converting the complementary signal into an analog signal and producing a compensation voltage corresponding to the amplitude of the analog signal; and a means for supplying, after lapse of an initiating period in which the maximum value is stored, to the A-D converter a compensated reference voltage obtained through the substraction of the level of the compensation voltage from the level of the standard reference voltage, to obtain from the analog-digital converter an output whose maximum value is standardized to a predetermined level.

Where the present device is used, for example, for measuring an electro-cardiac waveform, an electro-cardiac waveform having a predetermined maximum value is at all times obtained in the form of an analog signal or digital signals through the application as an input to the present device of an electro-cardiac waveform of an individual person, even if the maximum value of an electro-cardiac waveform differs from person to person. Where the electro-cardiac waveform of each person is measured, if an operation is effected to store the maximum value of the digital signal of the A-D converter during the initiating period, an output having a predetermined maximum value is obtained, after lapse of the initiating period, from the A-D converter.

This invention can be more fully understood from the following detailed description when taken in conjunction with the accompanying drawings, in which.

Figure 1:
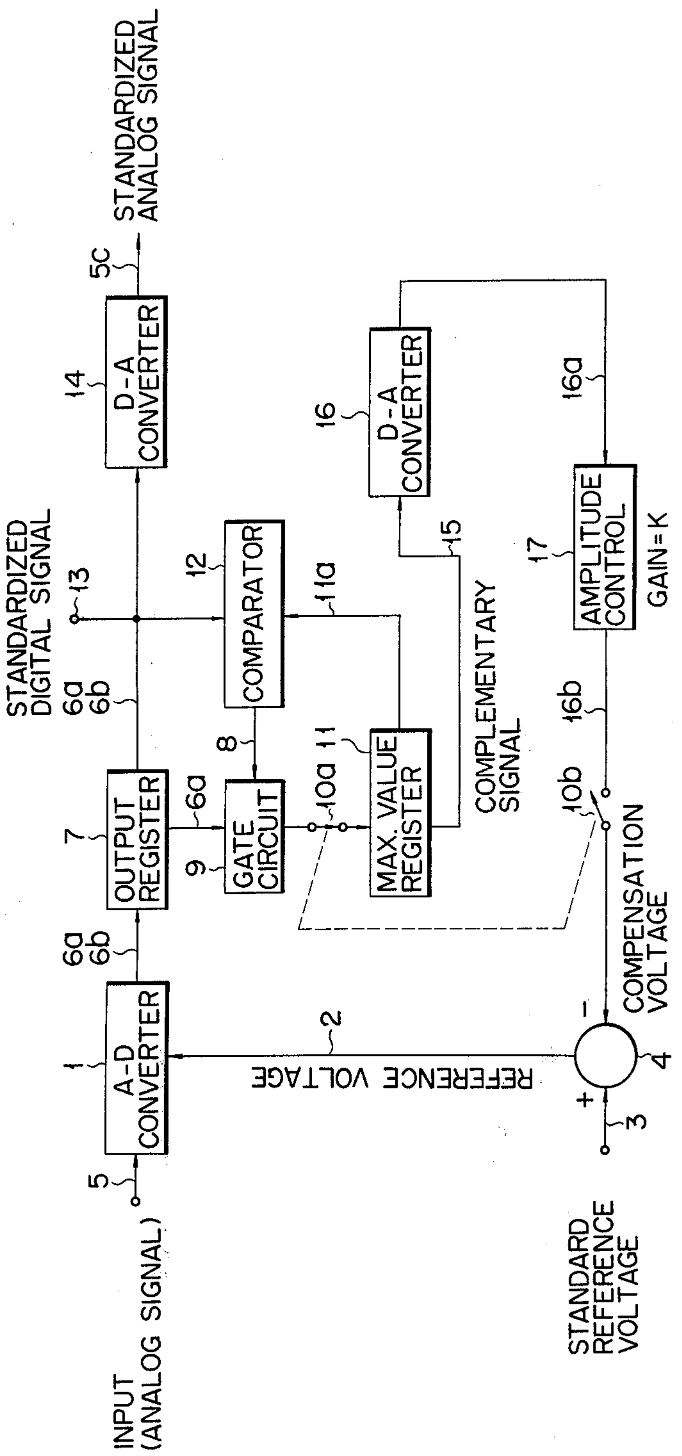
FIG. 1 is a block diagram showing one embodiment of this invention.

In FIG. 1, a reference voltage 2 or a standard reference voltage 3 is supplied through a differential circuit 4 to an A-D converter 1. An analog signal 5 for example, an electrocardiac waveform is supplied as an input to the A-D converter. With the A-D converter, the input analog signal 5 is sampled for a predetermined sampling period and converted into digital signals *6a* and *6b* corresponding to a standard reference voltage 3 and to a reference voltage 2, respectively. An output register 7 stores the digital signal *6a* or *6b* for each predetermined period corresponding to the sampling period and produces an output identical in content with the stored information. The output *6a* of the output register 7 is fed to a gate circuit 9 whose gate is opened only when a gate signal 8 to be later described is applied, and then to a maximum value register 11 through a switch *10a* adapted to be closed only for an initiating period. The digital signals *6a*, *6b* and stored contents *11a* of the maximum value register 11 are supplied to a comparator circuit 12 adapted to produce the above-mentioned gate signal 8 only when the digital signals *6a*, *6b* are greater than the digital signal *11a*.

An output of the output register 7 is either derived directly from a terminal 13 or fed to a D-A converter 14 for conversion into an analog signal.

The maximum value register 11 is designed to also produce a complementary signal of the stored maximum value (for example, a complementary signal is obtained by means of inverters). The complementary signal of the maximum value register is fed to a D-A converter 16 for conversion into an analog signal *16a*. The analog signal *16a* is passed through an amplitude control circuit 17 having a gain K, for example, through a voltage dividing circuit and taken out as a compensation signal *16b*. The compensation voltage *16b* is applied through a switch *10b* to the differential circuit 4.

The differential circuit 4 supplies to the A-D converter a reference voltage 2 obtained by subtracting the level of the compensation voltage *16b* from that of the standard reference voltage 3.

The switch 10a is ganged with the switch 10b, and during during a predetermined period involved before the maximum value of the input analog signal 5 is standardized the switch 10a is closed as shown in the Figure. After lapse of the predetermined period the switch 10b is closed and at the same time the switch 10a is opened.

There will be explained the operation of the abovementioned device.

The switches 10a and 10b are operated to be in the states as shown in the Figure and the maximum value register 11 is set initially so that its stored contents are "0000.....0000." Then, an analog signal 5 is fed to the A-D converter 1. For the convenience of explanation, let 0–10V be an input voltage range when a standard reference voltage is applied as a reference voltage to the A-D converter. Suppose that the maximum value of the input analog signal is 4V. Since the switch 10b is opened, the standard reference voltage 3 is applied to the A-D converter 1 to obtain a digital signal 6a. The digital signal 6a is supplied through the output register 7 to the D-A converter 14 and it will be apparent that the digital signal 6a is converted, at the D-A converter, into an analog signal having the same maximum value as the input analog signal 5.

On the other hand, the output of the output register 7 is supplied, under the action of a gate signal 8, through the gate circuit 9 to the maximum value register 11 during a predetermined period, i.e., a period in which the switch 10a is closed. Since the maximum value register 11 is initially set to "0000..... 0000," digital signals 6a of higher values are successively stored in the maximum value register 11 and eventually a digital signal corresponding to the maximum value 4V is stored. This predetermined period is defined in this invention as an initiating period.

When the switch 10b is thrown in, the switch 10a is opened. The stored content of the maximum value register 11 is held as is and a complementary signal 15 corresponding to the maximum value of the digital signals appearing during the initiating period continues to be supplied to the D-A converter 16. The complementary signal is converted at the D-A converter 16 into an analog signal 16a. The analog signal is amplitude adjusted, as required, to obtain a compensation voltage which is then applied to the differential circuit 4. As a result, the A-D converter converts an input analog signal 5 into a digital signal 6b in a manner to correspond to a new reference voltage 2. That is, during a measuring period, even if an analog signal having a maximum voltage 4V (FIG. 2–5b) is supplied to the A-D converter 1, a digital output signal 5c is obtained from the A-D converter. In other words, an analog signal having a maximum value 10V can be obtained from the D-A converter 14. In other words, an analog signal having a predetermined maximum amplitude can be obtained from the D-A converter 14 irrespective of the magnitude of the analog signal 5.

The amplitude control circuit 17 serves the double purpose of compensating for the errors involved between the A-D conversion at the A-D converter 1 and the D-A conversion at the D-A converter 16 and of adjusting the level of an output signal of the D-A converter 14 to prevent an overflow of the output register 14 by adjusting the level of the compensating voltage 16b.

Figure 2:
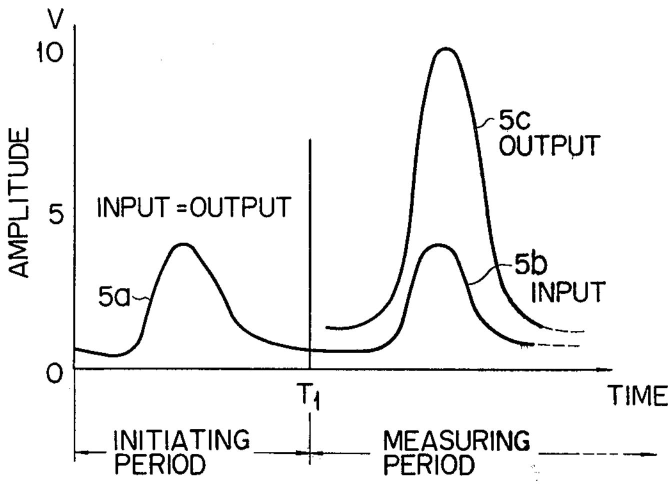
FIG. 2 is a waveform showing a comparison between an input analog signal waveform of the device of FIG. 1 and an output analog signal waveform whose maximum amplitude is standardized to a predetermined level.

In a graphical representation of FIG. 2, an abscissa or time axis denotes the initiating period $(0 - T_1)$ and the measuring period $(T_1.....)$ in which the amplitude of the analog input signal 5 is standardized to a predetermined level, and an ordinate denotes the amplitude of voltage. A waveform 5a appearing during the time period $(0 - T_1)$ indicates that the input analog signal 5 and the output waveform of the D-A converter 14 are identical. A waveform 5b appearing during the measuring period denotes the waveform of the input analog signal and a waveform 5c indicates a waveform standardized to a predetermined maximum amplitude.

During the measuring period, each input analog signal 5 whose maximum value is below 4V is handled properly, as a waveform corresponding to the new reference signal 2. Where there is such a fear that a maximum value of the input analog signal appearing during the measuring period $(T_1.....)$ becomes somewhat larger than a maximum value of the input analog signal appearing during the initiating period, the compensation voltage 16b is so preset that the maximum value of the output of the D-A converter 14 is made to be lower than 10V, for example, to be 9.5V through amplitude control circuit 17. As a result, any overflow of the output register can be avoided.

Explanation will be made of reasons why the object of this invention can be attained by obtaining a compensation voltage from the complementary signal of the maximum value stored in the maximum value register 11.

By way of example, explanation will be made assuming the use of the D-A converter 16 based on a "successive approximation method." Let $0 - X$ volt be a specified input range when the standard reference voltage is applied as a reference voltage to the A-D converter. In this case, the standard reference voltage is selected as ½X. Since during the initiating period $(0 - T_1)$ a compensation voltage 16b is not applied to the differential circuit 4, the level of the reference voltage 2 is equal to the level of the standard reference voltage 3, i.e., ½X. Consequently, when a maximum value of the analog signal 5 is "0"V, stored contents of the muximum value register 11 are "0000....0000" and when the maximum value of the analog signal 5 is "*X*"V, stored contents of the maximum value register are "1111.....1111."

When during the measuring period the maximum value of the analog signal 5 is E volt (provided that $E \leq X$), then a binary number corresponding to the maximum value is stored in the maximum value register 11 and a complement of the binary number is supplied to the D-A converter 16 to obtain an output $(X - E)$. Suppose that the gain K of the amplitude control circuit 17 is preliminarily selected as ½. Then, a compensation voltage appearing during the measuring period is $½(X - E)$ and the level of the reference voltage 2 will be $½X - ½(X - E) = ½E$. To explain more in detail, the level of the reference voltage with respect to the maximum value X of the analog signal appearing during the initiating period is ½X, and the reference voltage with respect to the analog signal E appearing during the measuring period is ½E. Therefore, the same corresponding relations hold. From this it will be apparent that during the measuring period the maximum value of the output 6b of the output register 7 will be "1111....1111." That is, the maximum value of the analog signal 5*b* appearing during the measuring period is standardized to "1111....1111."

Though with the above-mentioned embodiment only the positive input analog signal 5 is considered, it will be clear that a negative input analog signal can be equally put to practice. Where the input analog signal varies in the positive as well as negative direction, the standardization of a maximum value can be effected taking a positive or negative maximum value into consideration. In other words, the absolute value of the output of the A-D converter, i.e., the portion excluding the sign bit, can be used to obtain the compensation voltage.

It is not necessary that the output register 7 and the maximum value register 11 have the same bit length. If no particular attention is to be paid to the accuracy of the maximum value of output of the D-A converter, there may be used a maximum value register having a bit length shorter than that of the output register. This permits a simplified circuit arrangement.

What is claimed is:

1. A device for standardizing the maximum value of an output signal corresponding to an input analog signal, comprising an analog-digital converter for converting an input analog signal into digital signals in a manner to correspond to a standard reference voltage or a compensated reference voltage; an output register for storing the output digital signal of the analog-digital converter for each predetermined period corresponding to a sampling period of the analog-digital converter and for permitting the stored signal to be read out therefrom; a first means for storing through the output register the maximum-valued one of the digital signals from the analog-digital converter which corresponds to the standard reference voltage, and for producing a complementary signal of the maximum-valued digital signal; a second means for converting the complementary signal into an analog signal and producing a compensation voltage; and a third means for supplying, after lapse of an initiating period, to the analog-digital converter, a compensated reference voltage obtained through the subtraction of the level of the compensation voltage from the level of the standard reference voltage, to obtain from the analog-digital converter an output whose maximum value is standardized to a predetermined level.

2. A device according to claim 1 in which said first means includes a maximum value register for storing the maximun-valued digital signal and producing a complementary signal corresponding to the maximum-valued signal; a gate circuit for supplying the output register, through a switch adapted to be closed during the initiating period, to the maximum value register only when a gate signal is supplied; and a comparator circuit for comparing the output of the maximum value register and the output of the output register and supplying the gate signal to the gate circuit only when the output of the output register is greater than the output of the maximum value register.

3. A device according to claim 1, further including a digital-analog converter for converting the output of the output register into an analog signal.

4. A device according to claim 1 in which said second means has a digital-analog converter for converting the complementary signal into an analog signal and an amplitude control circuit for controlling the amplitude of this analog signal.

* * * * *